(12) United States Patent
Chen et al.

(10) Patent No.: US 10,505,202 B1
(45) Date of Patent: Dec. 10, 2019

(54) PROCESS FOR MAKING CATALYST AND GAS DIFFUSION HYBRID ELECTRODE MEMBER(S) FOR FUEL CELL

(71) Applicants: Kuan-Wei Chen, Tainan (TW); Jason Shian-Ching Jang, Tainan (TW); Kuan-Yu Chen, Tainan (TW)

(72) Inventors: Kuan-Wei Chen, Tainan (TW); Jason Shian-Ching Jang, Tainan (TW); Kuan-Yu Chen, Tainan (TW)

(73) Assignee: Taichi Metal Material Technology Co., Ltd., Tainan (TW)

( * ) Notice: Subject to any disclaimer, the term of this patent is extended or adjusted under 35 U.S.C. 154(b) by 19 days.

(21) Appl. No.: 15/996,536

(22) Filed: Jun. 4, 2018

(51) Int. Cl.
*H01M 8/02* (2016.01)
*H01M 4/92* (2006.01)
*H01M 4/88* (2006.01)
*H01M 4/86* (2006.01)
*H01M 4/02* (2006.01)

(52) U.S. Cl.
CPC .......... *H01M 4/926* (2013.01); *H01M 4/8631* (2013.01); *H01M 4/8807* (2013.01); *H01M 2004/029* (2013.01)

(58) Field of Classification Search
None
See application file for complete search history.

(56) References Cited

U.S. PATENT DOCUMENTS 9,077,042 B2 * 7/2015 Zhang ..................... H01M 4/90

* cited by examiner

*Primary Examiner* — Haroon S. Sheikh

(57) ABSTRACT

A process for making a catalyst and gas diffusion hybrid electrode member (or members) adapted for use in a fuel cell by integrally bonding a plurality of catalyst and gas diffusion layers to be a catalyst and gas diffusion hybrid electrode member to be inserted between two bipolar plates of the fuel cell for simplifying the production and decreasing the cost.

10 Claims, 2 Drawing Sheets

PROCESS FOR MAKING CATALYST AND GAS DIFFUSION HYBRID ELECTRODE MEMBER(S) FOR FUEL CELL

BACKGROUND OF THE INVENTION

U.S. Pat. No. 7,416,804 to E.I. du pont de Nemours and Company disclosed a process for making planar framed membrane electrode assembly array adapted for use in the fuel cells, namely for making single or multiple planar array five layer membrane electrode assemblies utilizing array assemblies, as well as the array assemblies themselves, comprising proton exchange membrane (PEM), catalyst coated membrane (CCM) and gas diffusion layers (GDL), as well as gas diffusion electrodes (GDE) for use in fuel cells.

However, for making the assemblies of so many membranes, including: proton exchange membrane, catalyst coated membranes and gas diffusion layers, it may be a complex process requiring complex procedures, possibly increasing production cost therefor.

Most particularly, typical manufacturing techniques involve the application of a catalyst coating composition onto substrates such as polymer membrane, including spraying, painting, patch coating, flexographic printing and screen-printing. However, such coating or printing of catalyst composition on the polymer substrates may be debonded, peeled, or even broken to thereby decrease the efficiency of the catalyst and the cell.

The present inventor has found the drawbacks of the prior art and invented the present process for making a catalyst and gas diffusion hybrid member for use in fuel cell.

SUMMARY OF THE INVENTION

The object of the present invention is to provide a process for making a pair of catalyst and gas diffusion hybrid electrode members adapted for use in a fuel cell by integrally bonding a plurality of catalyst and gas diffusion layers to be the catalyst and gas diffusion hybrid electrode members for simplifying the production and decreasing the cost.

DETAILED DESCRIPTION

Figure 1:
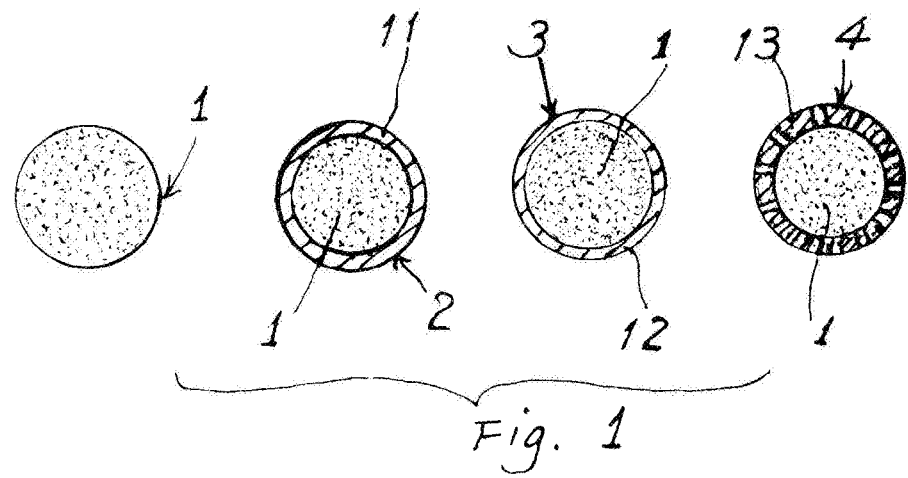
FIG. 1 shows a cross sectional views of plurality of basic elements, namely, the carbon fiber core, the alloy or metal-plated carbon fiber core, and the catalyst-plated carbon fiber core of the present invention.

As shown in FIG. 1, a carbon fiber core 1 is provided for further processing in order to form the related carbon fiber core plated or circumferentially plated with metal, alloy, metallic glass, and catalyst.

Carbon fiber core 1 contains a plurality of carbon fibers by integrating or forming a bundle of the plurality of carbon fibers. The fibers may be dense or loose by adjusting the number of fibers as contained in each carbon fiber core.

The carbon fiber core 1 is circumferentially plated or clad with an alloy film, a metallic glass film or a metal film 11 around the carbon fiber core by sputtering or other processes to be an alloy or metal plated carbon fiber core 2 as shown in FIG. 1.

The carbon fiber core 1 is circumferentially plated or clad with a thin catalyst film 12 such as platinum film around the carbon fiber core 1 (such as by PVD process) to form a catalyst-plated carbon fiber core 3 as shown in FIG. 1. The carbon fiber core 1 containing the carbon fibers may be served for gas diffusion, such as for $H_2$ or $O_2$ diffusion therethrough.

The carbon fiber core 1 may be circumferentially plated with a thin gas-permeable catalyst film 13 around the carbon fiber core 1 to form a gas-permeable catalyst-plated carbon fiber core 4 as shown in FIG. 1. Such a gas-permeable catalyst film 13 may be a palladium (Pd) film as circumferentially plated around the carbon fiber core 1 since palladium can be gas permeable and can also serve as a catalyst in the catalytic reaction from hydrogen ($H_2$) to hydrogen ion or proton ($H^+$).

The alloy film 11 as circumferentially plated on the carbon fiber core 1 as shown in FIG. 1 may be a metallic glass film 11 selected from Fe-based metallic glass, Ni-based metallic glass, Al-based metallic glass, Ag-based metallic glass, Au-based metallic glass, Pd-based metallic glass, Cu-based metallic glass, and other metallic glasses, including multiple-element-based metallic glass, not limited in the present invention.

The metallic glass or alloy film 11 as circumferentially plated or clad on the carbon fiber core 1 may increase the strength, hardness, anti-scratching property, anti-corrosion property, and toughness of the product, especially being able to overcome the fragile property of carbon fiber (if not being plated with alloy or metallic glass film).

Figure 2:
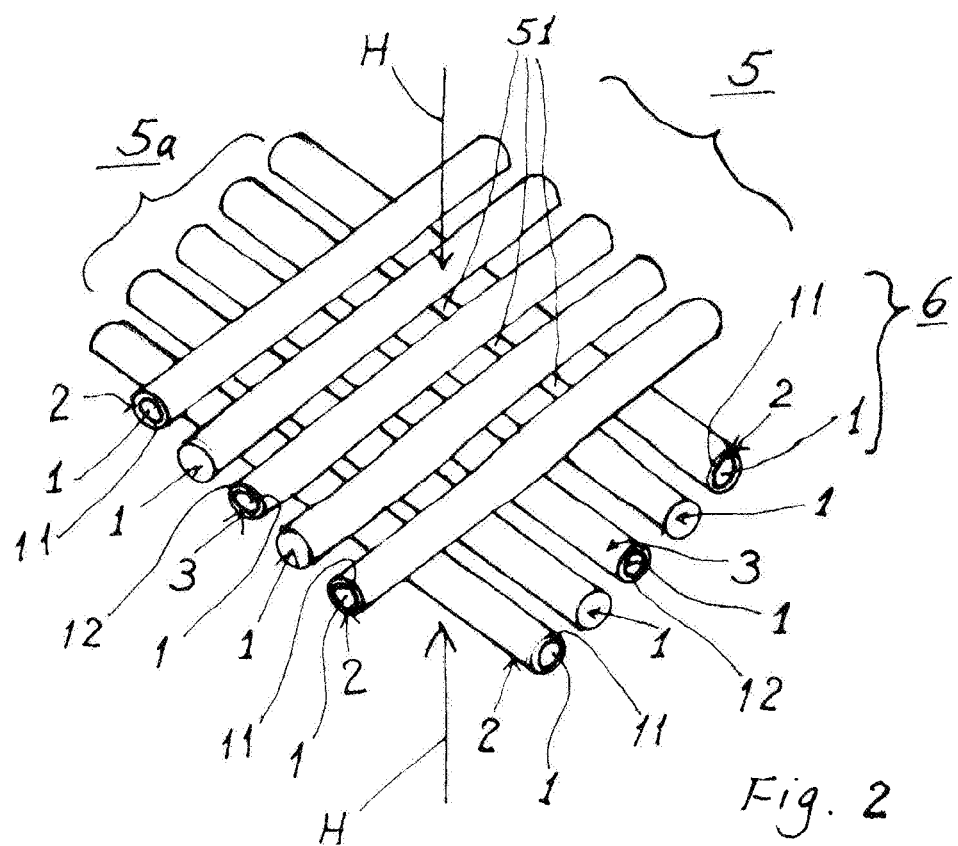
FIG. 2 is an enlarged perspective illustration showing the overlapping of the plural catalyst and gas diffusion hybrid layers in order for making the hybrid electrode member of the present invention.
Figure 3:
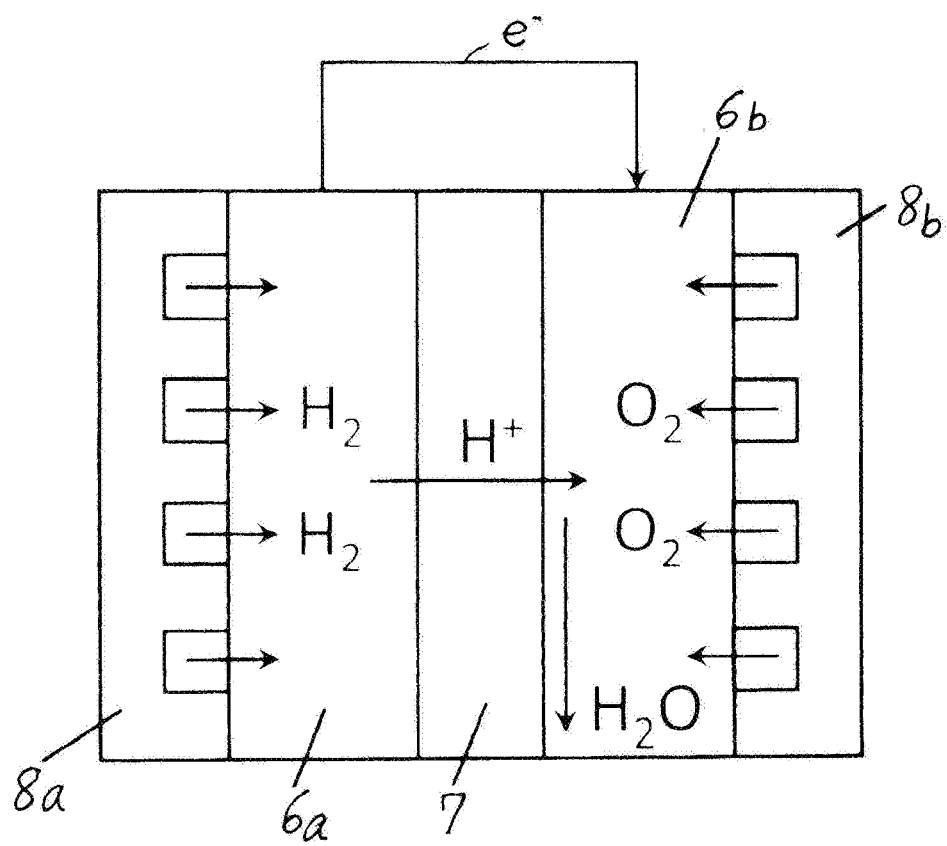
FIG. 3 is an illustration of the present invention as incorporated in a fuel cell.

As shown in FIG. 2, a plurality of carbon fiber cores, 1, alloy or metal plated carbon fiber plated carbon fiber cores 2, and catalyst-plated carbon fiber cores 3 may be parallelly juxtaposed, arrayed, collimated, or woven to be a catalyst and gas diffusion hybrid layer 5 as shown in an upper layer 5 or a lower layer 5a of FIG. 2. Both upper and lower layers 5, 5a are superimposed and thermally bonded (such as by heat H and pressure) to form a catalyst and gas diffusion hybrid electrode member 6a or 6b to be respectively disposed on an anode side 6a and a cathode side 6b (or opposite sides) of a central electrically insulating proton penetrating filter 7 as shown in FIG. 3.

In FIG. 2, the carbon fiber cores 1, 2 and 3 of the upper layer 5 are each projectively perpendicular or oblique to the cores 1, 2 and 3 of the lower layer 5a so as to form a plurality of crisscross apertures 51, allowing gas or ion passage through each crisscross aperture 51.

Each crisscross aperture 51 may be substantially formed as a micro pore among the cores 1, 2 and 3 in order to allow the passage of hydrogen ions therethrough, but precluding passing of the large molecules of reactants from anode side 6a to cathode side 6b (FIG. 3) in the fuel cell.

The layers 5, 5a as shown in FIG. 2 may be further overlapped or superimposed to be multiple layers or stack layers, not limited in this invention.

The gas permeable catalyst-plated carbon fiber core 4 as shown in FIG. 1 may serve to substitute the catalyst-plated carbon fiber core 3 and the alloy plated carbon fiber core 2 to form another catalyst and gas diffusion hybrid layer 5 (not shown). The Palladium metal may play double roles, both as a catalyst and a gas permeable element in this invention.

In FIG. 2, a typical arrangement of a catalyst and gas diffusion layer 5 may be shown in the following sequence:

... ②-①-③-①-② ...

Since carbon fiber 1 is gas permeable or gas diffusive, a catalyst-plated carbon fiber core 3 is sandwiched in between two carbon fiber cores 1, 1 as above-shown to provide a better gas permeability around the catalyst-plated carbon fiber core 3 to enhance the catalytic reaction such as: $H_2 \rightarrow 2H^+ + 2e^-$ An alloy (or metallic glass) plated carbon fiber core 2 is juxtaposed by one side of each carbon fiber core 1 to reinforce the carbon fiber core 1 to overcome the fragile defect of the carbon fiber.

Naturally, other arrangements for arraying the carbon fiber cores. 1, 2, and 3 may be chosen or adjusted, not limited in this invention.

Around a central electrically insulating proton penetrating filter 7, two catalyst and gas diffusion hybrid electrode members, 6a and 6b are disposed on an anode side (6a) of the filter 7, and a cathode side (6b) of the filter 7 (in between bipolar plates 8a and 8b) to complete a full cell as shown in FIG. 3.

The proton penetrating filter 7 is provided to substitute the conventional proton exchange membrane (PEM) to allow the penetration of hydrogen ions through the filter to move from the anode side towards the cathode side, to complete the electrolytic reaction of the fuel cell as follows:

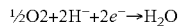

$$\tfrac{1}{2}O_2 + 2H^+ + 2e^- \rightarrow H_2O$$

The proton penetrating filter 7 may be made of: porous ceramics, polymers, or electrolytes, which is electrically insulative and proton or hydrogen ion penetrable, not limited in this invention. The filter 7 must preclude the passage of reactants through the filter 7 to pass $H^+$ through the filter.

The filter 7 and the two catalyst and gas diffusion hybrid electrode members 6a and 6b may be integrally formed as a "module" to be inserted between the bipolar plates 8a and 8b as shown in FIG. 3.

The metallic glass film 11 as plated on the carbon fiber core 1 may be selected from gas permeable metallic glass to form a gas permeable alloy plated carbon fiber core 2 (FIG. 2). Then, the "nude" carbon fiber core 1 (without being plated with alloy or metal) may then be replaced with gas permeable metallic glass-plated carbon fiber core 2 to enhance the strength (for prevention of fragile defect) of the core 2, but still maintaining its gas permeability.

The carbon fiber cores 1 near the anode or cathode should be made of "loose" carbon fiber cores to enhance the gas diffusion, while the carbon fiber cores 1 near the central filter 7 should be made as "dense" carbon fiber cores to allow hydrogen ions to pass through the filter, but precluding the passage of large reactant molecules.

The word "loose" means less carbon fibers contained in the core. While the word "dense" means more carbon fibers contained in the core.

When plural hybrid members 5 are stacked and overlapped for thermally bonding thereof, as subjected to heat H or pressure [such as by applying compression pressure from a mold having an upper mold and a lower mold for clamping the hybrid members between the upper and lower molds (not shown)], the heat may cause melting or deformable softening of alloy or metallic glass film 11 to "impregnate" into carbon fibers of neighboring carbon fiber cores 1 and a critical point of this invention must be taken into consideration, namely, each crisscross aperture 51 among the cores 1, 2, 3 should be well arranged and pre-designed for the production system of this invention in order not to blockade such crisscross apertures 51 when alloy is melted or deformably softened, thereby-allowing an optimum gas permeability therethrough. The sizes or density (loose or dense distribution) of the crisscross apertures 51 among the cores 1, 2, and 3 may be optimally designed in this invention.

Nevertheless, the "nude" carbon fiber core 1 (not plated with alloy or metallic glass) may still play its role for gas permeability without any problem.

The present invention is superior to the prior arts with the following advantages:

1. As indicated in the designation of this invention, the word "hybrid" discloses an improvement by combining conventional catalyst layer and gas diffusion layer to be an integrated hybrid electrode member 5 which is then formed as an electrode in this invention, thereby greatly reducing the production and maintenance cost of a fuel cell.
2. Both carbon fibers and alloy films are electrically conductive, this invention may thus facilitate the electrolytic reaction in the fuel cell due to good electrical conductively (and less electric resistance).
3. The alloy or metallic glass plated carbon fiber cores may help reinforce the strength of the hybrid member to prolong the service life of the fuel cell.
4. Catalyst film is a thin film homogeneously plated on the carbon fiber core, thereby increasing the catalyst efficiency of the cell.
5. The hybrid layers 5 are thermally bonded to form hybrid electrode members 6a and 6b. No adhesive or resin are used for bonding so that the strength, electric conductivity, and resistance to inlet gas pressure will be overall increased, thereby increasing the cell efficiency and the commercial value thereof.
6. A compact unit can be made by reducing the total volume of the complete set of cell, better for a product design. The parts, elements and raw materials may be decreased, thereby being beneficial for environmental protection.

The present invention may be further modified without departing from the spirit and scope of this invention.

We claim:

1. A process for making catalyst and gas diffusion hybrid electrode member for fuel cell, comprising:
    A. Preparing carbon fiber cores, preparing alloy, metal or metallic glass plated carbon fiber cores, and preparing catalyst-plated carbon fiber cores;
    B. Parallelly juxtaposing, arraying, collimating or weaving said plurality of carbon fiber cores, said alloy or metallic glass plated carbon fiber cores, and said catalyst-plated carbon fiber cores to be a catalyst and gas diffusion hybrid layer; and
    C. Superimposing a plurality of said catalyst and gas diffusion hybrid layers by thermally bonding said hybrid layers to be a catalyst and gas diffusion hybrid electrode member.

2. A process according to claim 1, wherein two said catalyst and gas diffusion hybrid electrode members are disposed on opposite sides of a central electrically insulating proton penetrating filter, and are inserted between two bipolar plates of a fuel cell.

3. A process according to claim 1, wherein said metallic glass plated carbon fiber core includes plating of a metallic glass film on said carbon fiber core: said metallic glass selected from: Fe-based metallic glass, Ni-based metallic glass, Al-based metallic glass, Ag-based metallic glass, Au-based metallic glass, Pd-based metallic glass, Cu-based metallic glass, and multiple-element-based metallic glass.

4. A process according to claim 1, wherein said catalyst-plated carbon fiber core includes plating of platinum catalyst on the carbon fiber core.

5. A process according to claim 1, wherein at least one said carbon fiber core is substituted with a gas permeable metallic glass-plated, or alloy-plated, or metal-plated carbon fiber core.

6. A process according to claim 1, wherein said metal-plated carbon fiber core and said carbon fiber core are replaced with a gas permeable catalyst-plated carbon fiber core, including a palladium-plated carbon fiber core.

7. A process according to claim 1, wherein said plurality of catalyst and gas diffusion hybrid layers at least include an upper hybrid layer overlapped or superimposed on a lower hybrid layer, with any one said carbon fiber core of said upper hybrid layer protectively perpendicular or oblique to any one said carbon fiber core of said lower hybrid layer.

8. A process according to claim 7, wherein said plurality of said carbon fiber cores of said upper and lower hybrid layers projectively define a plurality of crisscross apertures among said carbon fiber cores.

9. A process according to claim 2, wherein each said catalyst and gas diffusion hybrid electrode member includes loose carbon fiber cores containing loose carbon fibers in each said loose core near each said bipolar plate, and dense carbon fiber cores containing dense carbon fibers in each said dense core near said central proton penetrating filter.

10. A process according to claim 2, wherein said filter is made of porous ceramics, polymers, and electrolytes, allowing passage of hydrogen ions through said filter.

\* \* \* \* \*